Figure 1:
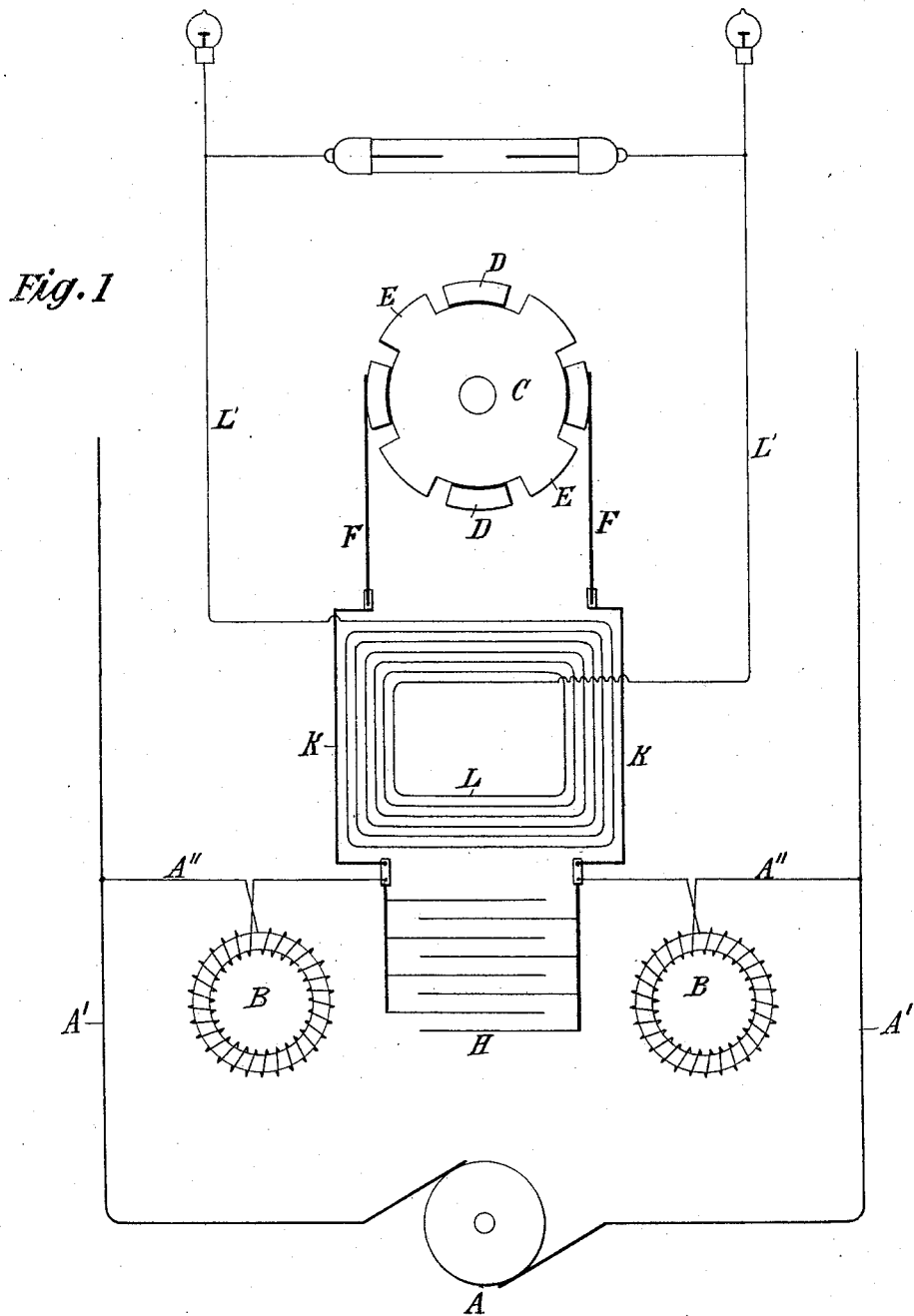

(No Model.) 2 Sheets—Sheet 1.

N. TESLA.
APPARATUS FOR PRODUCING ELECTRIC CURRENTS OF HIGH FREQUENCY AND POTENTIAL.

No. 568,176. Patented Sept. 22, 1896.

Witnesses:
Raphael Netter
Drury W. Cooper

Nikola Tesla, Inventor
by Kerr, Curtis & Page.
Att'ys.

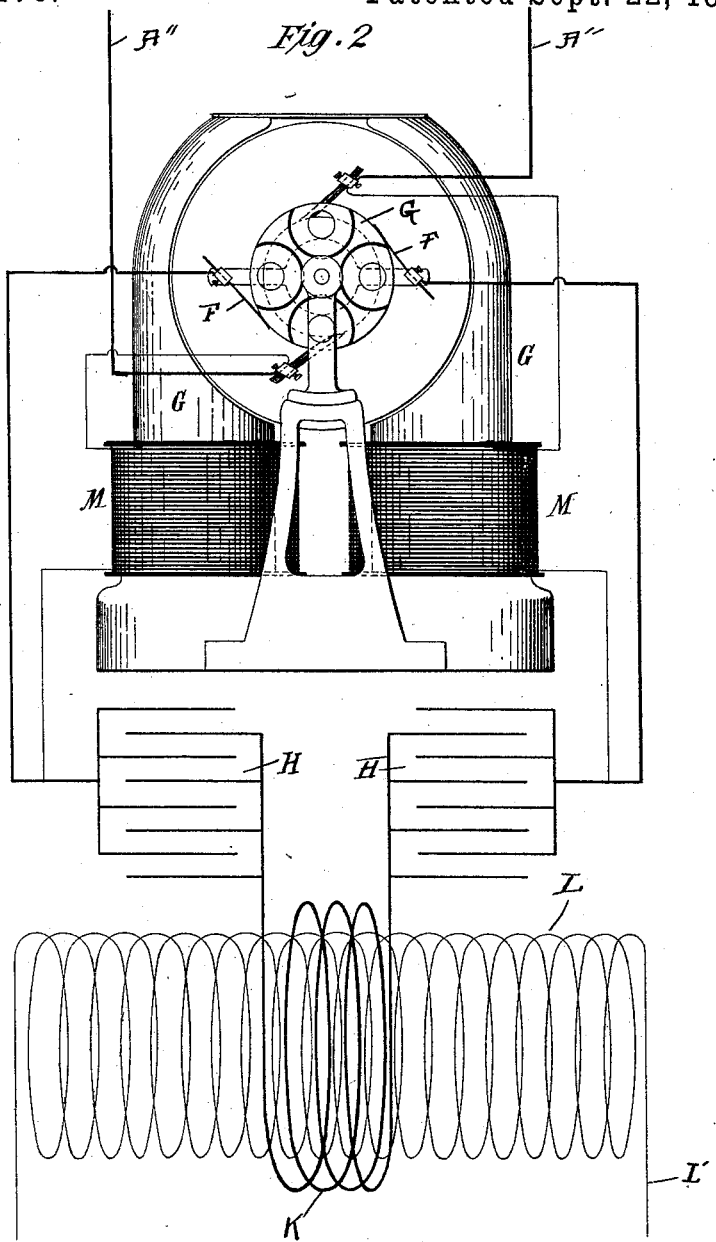

UNITED STATES PATENT OFFICE.

NIKOLA TESLA, OF NEW YORK, N. Y.

APPARATUS FOR PRODUCING ELECTRIC CURRENTS OF HIGH FREQUENCY AND POTENTIAL.

SPECIFICATION forming part of Letters Patent No. 568,176, dated September 22, 1896.

Application filed April 22, 1896. Serial No. 588,534. (No model.)

*To all whom it may concern:*

Be it known that I, NIKOLA TESLA, a citizen of the United States, residing at New York, in the county and State of New York, have invented certain new and useful Improvements in Apparatus for the Production of Electric Currents of High Frequency and Potential, of which the following is a specification, reference being had to the drawings accompanying and forming a part of the same.

The invention which forms the subject of my present application is embodied in an improvement on an electrical apparatus invented by me and described in prior Letters Patent, notably in United States Patents No. 462,418, dated November 3, 1891, and No. 454,622, dated June 23, 1891. This apparatus was devised for the purpose of converting and supplying electrical energy in a form suited for the production of certain novel electrical phenomena which require currents of higher frequency and potential than can readily or even possibly be developed by generators of the ordinary types or by such mechanical appliances as were theretofore known. The apparatus, as a whole, involves means for utilizing the intermittent or oscillating discharge of the accumulated electrical energy of a condenser or a circuit possessing capacity in what may be designated the "working" circuit, or that which contains the translating devices or those which are operated by such currents.

The object of my present improvements is to provide a simple, compact, and effective apparatus for producing these effects, but adapted more particularly for direct application to and use with existing circuits carrying direct currents, such as the ordinary municipal incandescent-lighting circuits. The way in which I accomplish this, so as to meet the requirements of practical and economical operation under the conditions present, will be understood from a general description of the apparatus which I have devised. In any given circuit, which for present purposes may be considered as conveying direct currents or those of substantially the character of direct or continuous currents and which for general purposes of illustration may be assumed to be a branch or derived circuit across the mains from any ordinary source, I interpose a device or devices in the nature of a choking-coil in order to give to the circuit a high self-induction. I also provide a circuit-controller of any proper character that may be operated to make and break said circuit. Around the break or point of interruption I place a condenser or condensers to store the energy of the discharge-current, and in a local circuit and in series with such condenser I place the primary of a transformer, the secondary of which then becomes the source of the currents of high frequency. It will be apparent from a consideration of the conditions involved that were the condenser to be directly charged by the current from the source and then discharged into the working circuit a very large capacity would ordinarily be required, but by the above arrangement the current of high electromotive force which is induced at each break of the main circuit furnishes the proper current for charging the condenser, which may therefore be small and inexpensive. Moreover, it will be observed that since the self-induction of the circuit through which the condenser discharges, as well as the capacity of the condenser itself, may be given practically any desired value, the frequency of the discharge-current may be adjusted at will.

The object sought in this invention may be realized by specifically different arrangements of apparatus, but in the drawings hereto annexed I have illustrated forms which are typical of the best and most practicable means for carrying out the invention of which I am at present aware.

Figure 1 is a diagrammatic illustration of the apparatus, and Fig. 2 a modification of the same.

Referring to Fig. 1, A designates any source of direct current. In any branch of the circuit from said source, such, for example, as would be formed by the conductors A" A" from the mains A' and the conductors K K, are placed self-induction or choking coils B B and a circuit-controller C. This latter may be an ordinary metallic disk or cylinder with teeth or separated segments D D E E, of which one or more pairs, as E E, diametrically opposite, are integral or in electrical contact with the body of the cylinder, so that when the controller is in the position in which the two brushes F F bear upon two of said segments E E the circuit through the choking-coils B will be closed. The segments D D are insulated, and while shown in the drawings as of substantially the same length of arc as the segments E E this latter relation may be varied at will to regulate the periods of charging and discharging.

The controller C is designed to be rotated by any proper device, such, for example, as an electromagnetic motor, as shown in Fig. 2, receiving current either from the main source or elsewhere. Around the controller C, or in general in parallel therewith, is a condenser H, and in series with the latter the primary K of a transformer, the secondary L of which constitutes the source of the currents of high frequency which may be applied to many useful purposes, as for electric illumination, the operation of Crooke's tubes, or the production of high vacua.

L' indicates the circuit from the secondary, which may be regarded as the working circuit.

A more convenient and simplified arrangement of the apparatus is shown in Fig. 2. In this case the small motor G, which drives the controller, has its field-coils in derivation to the main circuit, and the controller C and condenser H are in parallel in the field-circuit between the two coils. In such case the field-coils M take the place of the choking-coils B. In this arrangement, and in fact generally, it is preferable to use two condensers or a condenser in two parts and to arrange the primary coil of the transformer between them. The interruptions of the field-circuit of the motor should be so rapid as to permit only a partial demagnetization of the cores. These latter, however, should in this specific arrangement be laminated.

The apparatus, as will now be seen, comprises, as essential elements, choking-coils, a circuit-controller, means for rotating the same, a condenser, and a transformer. These elements may be mechanically associated in any convenient and compact form, but so far as their general arrangement and relations are concerned I prefer the relative disposition illustrated, mainly because, by reason of their symmetrical arrangement in the circuit, the liability of injury to the insulation of any of the devices is reduced to a minimum.

I do not mean to imply by the terms employed in describing my improvements that I limit myself to the use of the precise devices commonly designated by such terms. For instance, the choking-coil as a distinctive device may be wholly dispensed with, provided the circuit in which it must otherwise be placed have a sufficiently high self-induction produced in other ways. So, too, the necessity of a condenser, strictly speaking, is avoided when the circuit itself possesses sufficient capacity to accomplish the desired result.

Having now described my invention and the manner in which the same is or may be carried into practical effect, what I claim is—

1. The apparatus herein described for converting direct currents into currents of high frequency, comprising in combination a circuit of high self-induction, a circuit-controller adapted to make and break such circuit, a condenser into which the said circuit discharges when interrupted, and a transformer through the primary of which the condenser discharges as set forth.

2. The combination of a source of direct current and a circuit therefrom, choking-coils in said circuit, means for making and breaking the circuit through said coils, a condenser around the point of interruption in the said circuit and a transformer having its primary in circuit with the condenser as set forth.

3. The combination with a circuit of high self-induction and means for making and breaking the same, of a condenser around the point of interruption in the said circuit, and a transformer the primary of which is in the condenser-circuit as described.

4. The combination with a circuit of direct current and having a high self-induction, of a circuit-controller for making and breaking said circuit, a motor for driving the controller, a condenser in a circuit connected with the first around the point of interruption therein, and a transformer the primary of which is in circuit with the condenser as set forth.

5. The combination with a circuit of direct current, a controller for making and breaking the same, a motor having its field-magnets in said circuit and driving the said controller, a condenser connected with the circuit around the point of interruption therein and a transformer the primary of which is in circuit with the condenser as set forth.

NIKOLA TESLA.

Witnesses:
EDWIN B. HOPKINSON,
M. LAWSON DYER.